INVENTOR.
MEYER PINCUS

BY

ATTORNEY

Jan. 20, 1970          M. PINCUS          3,490,421

OPTICAL OBSERVATION PORT

Filed March 17, 1969          3 Sheets-Sheet 3

INVENTOR.
MEYER PINCUS

BY *C.F. Bryant*
ATTORNEY

United States Patent Office 3,490,421
Patented Jan. 20, 1970

3,490,421
OPTICAL OBSERVATION PORT
Meyer Pincus, Longmeadow, Mass., assignor to Combustion Engineering, Inc., Windsor, Conn., a corporation of Delaware
Continuation of application Ser. No. 778,953, Nov. 26, 1968. This application Mar. 17, 1969, Ser. No. 816,146
Int. Cl. F23m 11/04
U.S. Cl. 122—235                                    9 Claims

ABSTRACT OF THE DISCLOSURE

The optical observation port of this disclosure makes use of the principles of a camera obscura to project a relatively wide angle image of the furnace interior on a ground glass, thereby eliminating the need for an observer to be in close proximity to the furnace wall. Further, the lens of such a system may be relatively small and, in one embodiment, may be located in the connecting fin between two adjacent wall tubes of the furnace, eliminating the need for displacing the wall tubes laterally. By mounting the observation port in a manner permitting pivotal motion, a further increase in the area viewed is obtained.

---

This application is a continuation-in-part of application Ser. No. 778,953 filed Nov. 26, 1968.

This invention is concerned with furnace observation ports and more particularly with an optical observation port which uses the principle of a camera obscura to project the image of the furnace interior on a ground glass. In furnaces and other similar chambers it is desirable to provide an opening, or openings, for the purpose of observing the inside of the furnace or chamber to determine flame presence, flame location, the build-up of combustion by-products, and other factors of interest. A glass window is usually utilized for observation of the furnace interior, though a simple passageway has sometimes been used. The use of a simple passageway without a glass window is generally unsatisfactory due to the hot combustion gases which may exit from the passageway and hinder direct observation. In installations of observation ports having glass viewing windows, the window is generally placed in communication with the interior of the furnace by means of a passageway extending therebetween.

Attempts to place the glass viewing surface sufficiently distant from the furnace interior to reduce the heat encountered by the observer have resulted in communicating passageways of such length that the angle of view to the furnace interior is greatly restricted and may be increased in such instances only by increasing the diameter of the passageway.

Other observation port designs have sought to increase the angle of view by forming a passageway in the shape of oppositely converging, frusto-conical, inner and outer sections with an axially elongated throat portion of restricted cross-section therebetween. However, such a structure requires displacement or bending of the wall tubes in order to accommodate it therebetween. This required bending of the tubes is both time consuming and expensive.

In order to overcome the disadvantages of the aforementioned prior art observation ports, I have employed the use of a camera obscura to project the image of the furnace interior on to a viewing surface. A camera obscura is basically a light proof chamber having an aperture which may contain a lens and through which the image of an object is recorded or displayed on a surface opposite the aperture. The simplest type of camera obscura exists wherein the image admitting aperture is a small "pinhole" with no lens. This system is advantageous in that it will provide a focused image at any distance from the "pinhole" regardless of the object distance in front of the "pinhole." However, because of the very small aperture required to obtain a focused image, the intensity of the image will be quite weak. In most instances the image will be too weak to be viewed because of ambient light. In order to provide a more intense image, a lens may be located in the aperture. The lens serves to focus the incident light, thereby providing a more intense image. A limitation of a system employing a lens is that the image will be in focus at only one point with respect to the lens and this will depend on the properties of the given lens and the location of the object with respect to the lens. However, this limitation may be easily overcome by providing an adjustable imaging surface and in instances such as those generally applicable in the use of observation ports, where the object distance is much greater than the focal length of the lens, the imaging surface will require little or no adjustment to remain in focus for different "long" object distances. Therefore, the embodiments to be herein discussed are those having a lens in the chamber aperture.

This type of observation port provides several advantages over existing ports. Firstly, the lens, because of its small size, may be adapted to be located within the fin between adjacent wall tubes without requiring displacement of the wall tubes. This represents a savings in time and money and is an operation which may be conveniently performed in the field. Secondly, an advantage is provided by the fact that the image received from the lens is displayed on a surface such as ground glass and an observer may view it at a distance from the display surface itself. A further advantage is recognized by admitting air at a relatively high pressure to the interior of the chamber and exhausting it through openings disposed such that the surface of the lens in contact with the furnace interior is maintained free of deposits. The air within the chamber will serve to cool the viewing surface thereby preventing discoloration of this surface and decreasing the possibility of burn to an observer who might contact such surface.

In one embodiment of the observation port of my invention, means are provided to allow angular movement of the port about a pivot point near the lens, thus increasing the overall field of view. A further advantage is realized by providing means for focusing the image received on the viewing screen.

Description of the invention

Figure 1:
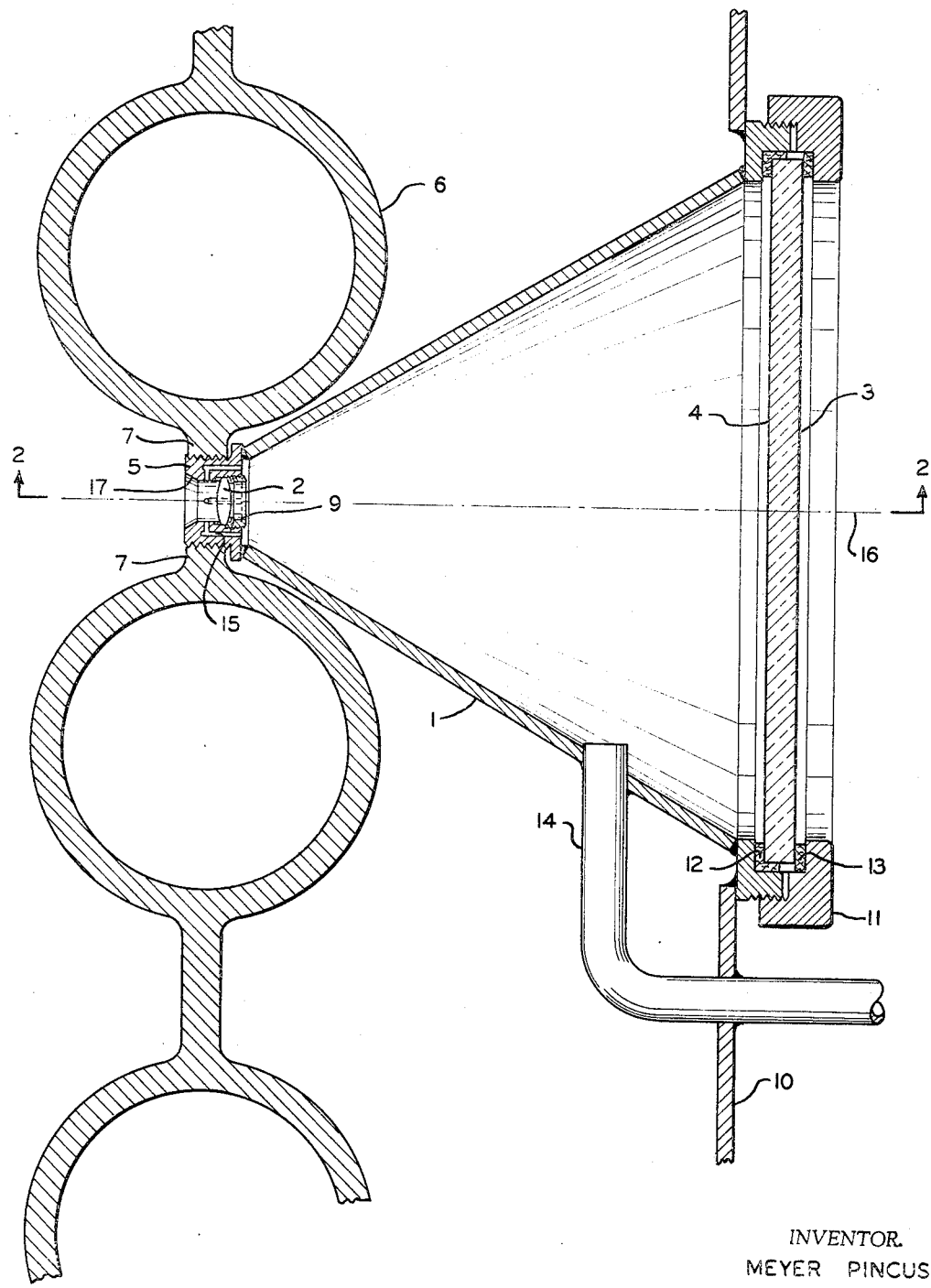
FIGURE 1 is a sectional plan view of the observation port.

The embodiment of my invention in its simplest form is shown in the plan view drawing of FIGURE 1 and is seen to include the basic elements of a camera obscura which includes a chamber wall 1, which has a frusto-conical shape for convenience, a lens 2 located at the minor base end of the frusto-conical chamber wall 1, and a viewing screen 3 at the major base of chamber wall 1 and opposite lens 2. The lens 2 is depicted as being of a double convex shape and viewing screen 3 is formed of glass. It will be realized that various other lens shapes and viewing screen materials may be employed, but these are found to be most satisfactory. The surface of viewing screen 3 facing the lens 2 is a ground glass surface 4. The ground glass surface 4 provides a translucent surface upon which the image received through lens 2 may be displayed. Because the remainder of glass viewing screen 3 is transparent, an observer outside of the camera obscura will see the image displayed on ground glass surface 4 when viewed through glass viewing screen 3.

Lens housing 5 is in registry with the furnace interior and is located in the area of the minor base of the chamber wall 1 and is secured, as by welding, thereto. Lens housing 5 is adapted to receive a conventional lens piece for mounting therein. I have found that a double convex lens having a 4½ inch focal length and an outside diameter small enough for location between the wall tubes 6 will provide a satisfactory image on glass viewing screen 3. Fin 7 between wall tubes 6 has a tapped hole to receive threaded lens housing 5. Lens housing 5, in this embodiment a hollow cylinder, is adapted to be threaded into the hole in fin 7. Further, the interior wall of lens housing 5 may be threaded to receive mounting ring 9 which serves to position and secure lens 2 within lens housing 5. The inner wall of lens housing 5 serves to define the aperture of the camera obscura and it will be noted that the axial length of lens housing 5 should be kept relatively short to prevent limiting the angle of view of the lens 2. When the lens 2 and lens housing 5 are located approximately in the plane of fin 7, a practical angle of view, as limited by the geometry of the wall tubes 6, the lens housing 5, and the chamber wall 1 will be approximately 60°.

The frusto-conical chamber wall 1 must have an apex angle of at least 60° in order to allow an angle of view of 60°. The major base of chamber wall 1 is secured, as by fastening, to the furnace casing 10 in an area of the furnace wall that has been removed to receive the observation port. The glass viewing screen 3 may take the shape of the major base of the chamber wall 1, in this instance a circular disc, and is held in registry with chamber wall 1 by means of a threaded retaining ring 11. Gaskets 12 and 13 are located on alternate sides of the glass viewing screen 3 and ensure a seal which is air tight and prevents breakage of the screen. The inner surface 4 of the viewing screen 3 is a conventional ground glass surface which will provide a display surface for the image received through the lens 2 when located at a proper distance from the lens 2.

Cleaning and cooling air is admitted to the chamber through chamber will 1 by means of a satisfactory conduit 14. This air need only be slightly above the operating pressure of the furnace so that it can be discharged through a plurality of ducts 15 with sufficient velocity to clean and cool the surface of lens 2 in contact with the furnace interior. Since this cleaning and cooling air is introduced into the observation port and subsequently into the interior of the furnace continuously during operation of the furnace, it is economically necessary to keep the pressure of this fluid down to the absolute minimum. The air also serves to cool the viewing screen 3 and prevent its discoloration.

Figure 2:
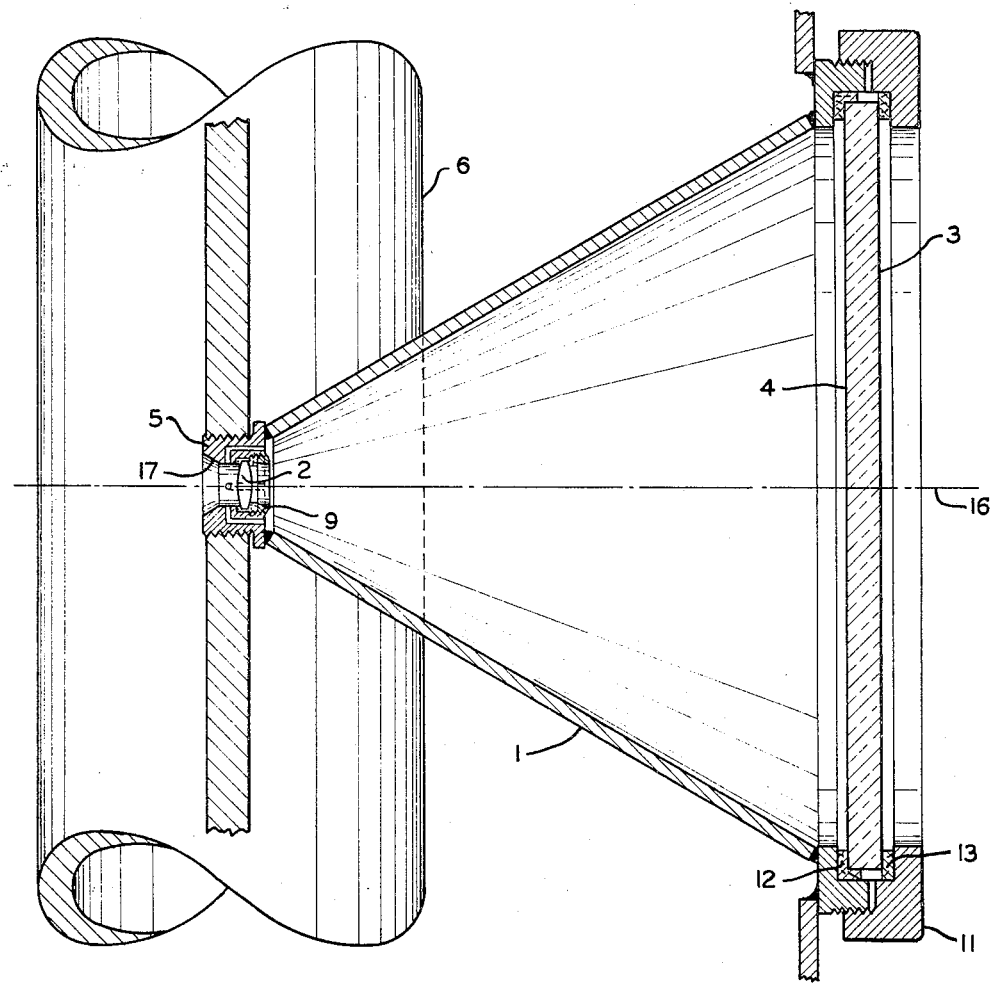
FIGURE 2 is a sectional side view of the observation port taken along lines 2—2 of FIGURE 1.
Figure 4:
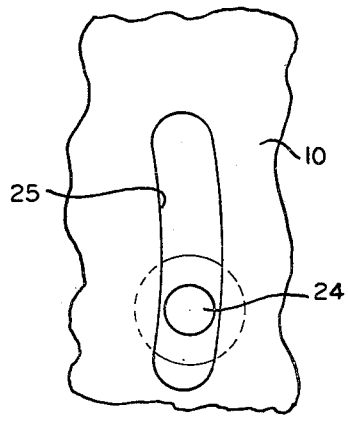
FIGURE 4 is a sectional front view of the locking mechanism taken along lines 4—4 of FIGURE 3.

FIGURE 2 is a sectional side elevation of FIGURE 1 taken along the lines 2—2 of FIGURE 1 and provides a further understanding of the structure of my invention. The plane of the glass viewing screen 3 is seen to be perpendicular to the principle axis 16 of lens 2.

Figure 3:
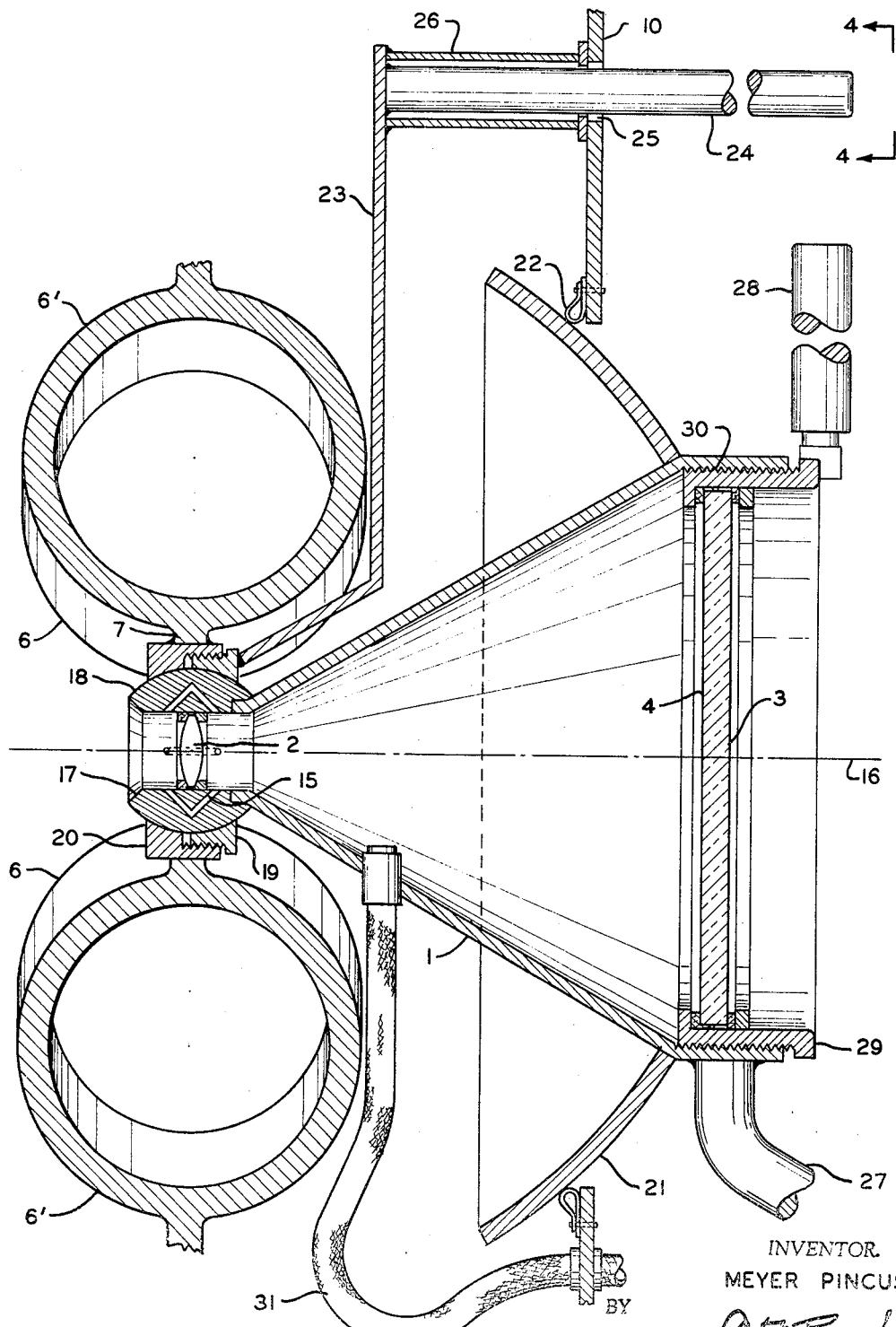
FIGURE 3 is a sectional plan view of an adjustable observation port.

The observation port of FIGURE 3 is similar in many respects to that of FIGURE 1 and those elements of FIGURE 3 which correspond with elements shown in FIGURES 1 and 2 are identically numbered. The observation port of FIGURE 3, however, has tilting capacity which provides increased overall field of view and additionally includes means for adjusting the focus of the displayed image. The latter feature is one which might easily be provided in the FIGURE 1 embodiment of the invention.

An increased overall field of view is obtained by providing means for pivoting the observation port about a point which is located at, or near, the center of lens 2. Such a system may be mounted in a location somewhat more remote from the furnace interior than that depicted in FIGURES 1 and 2 by means of a mounting plate. However, the wall tubes 6 in such an arrangement will tend to reduce the horizontal angle of view in return for an increased angle of view vertically.

An increased overall field of view in the horizontal and vertical directions, as well as intermediate directions, may be attained by slightly displacing the wall tubes 6 in a lateral direction and placing the lens holder and lens between the adjacent displaced wall tubes to permit pivotal movement. Pivotal movement through an angle of about 15° in any direction from a line perpendicular to the plane of the wall tubes 6 is easily attainable. This pivoting capacity will increase the total viewing angle from 60° to approximately 90°.

The pivoting motion of the observation port is accomplished by means of a ball and socket joint. Lens housing 18 is spherical in shape and has a cylindrical hole through its center; the axis of the cylindrical hole is in common with the principal axis of lens 2 which is mounted therein. Lens housing 18 is mounted and supported in a socket. The socket is comprised of opposing half members with male socket member 19 being adapted for threaded engagement with female member 20 which is mounted in a fixed position to displaced wall tubes 6'. This arrangement permits freedom of pivotal or orbital motion about the spherical center, limited only the wall tubes, 6'. A spherical cowl 21 is mounted about the outer periphery of the chamber wall 1 at its major base end and the cowl 21 is in sliding engagement with a gasket 22. The gasket 22 is mounted around the periphery of a circular hole in the furnace casing 10 through which the observation port is located. The gasket 22 provides a supporting and sealing function. Pivotal movement of lens housing 18 is possible when male socket member 19 is in loose engagement with female socket member 20. Pivotal movement is prevented when members 19 and 20 are in such close engagement that friction between their surfaces and that of lens housing 18 cannot be overcome. A locking mechanism which allows or restricts said pivotal motion is provided through means which permit the observer to increase or decrease the extent of engagement of member 19 with that of member 20. Secured to member 19 is locking lever 23 to which is securely mounted, in a perpendicular direction, locking handle 24 which passes through a arcuately shaped slot 25 in the casing 10. Locking lever 23 is spaced from casing 10 by means of a cylindrical tube spacer 26. Angular movement of locking handle 24 in a threaded engaging direction, generally clockwise, will serve to lock the observation port in a particular position. Moving handle 24 in the opposite direction will unlock the observation port for pivoting. Positioning of the observation port is aided by means of hand grip 27 which is secured to chamber wall 1.

As before noted, in systems having a lens of relatively short focal length and used for viewing objects which are relatively distant from said lens, little or no focusing adjustment is necessary for varying distances between the object and the lens. However, if the objects viewed are relatively close to the lens, as within a few focal lengths, a focus adjustment capability will be necessary for varying object distances. Focusing of the image is accomplished by moving the viewing screen 3 with respect to lens 2 along principal axis 16. This movement of viewing screen 3 is accomplished by rotating the focus handle 28 to increase or decrease the extent of engagement of focusing threads 30 on the outer periphery of screen mount 29 and on the inner periphery of chamber wall 1.

Air conduit 31, which passes through chamber wall 1, provides air to the chamber and through ducts 15 to the lens face area in the same manner as in the embodiment of FIGURE 1. Conduit 31 may be of any satisfactory material having the flexibility required to allow movement of the observation port.

This system of furnace observation which uses a lens and an imaging screen is best used in a clean fuel system such as with gas or oil, however, its use in a coal fire environment is permitted through use of the cleaning air on the lens surface.

One may wish to employ inverting mirrors or prisms to right the inverted image produced by a converging lens, however, a righted image is not generally necessary. Additionally, one may wish to employ a shading hood or other means about the area of the viewing screen to block the ambient light, thus providing a more distinct image of the object being viewed.

While I have illustrated and described two embodiments of my invention, it will be understood that minor changes in construction and arrangement of parts may be made without departing from the spirit and scope of the invention as claimed. It is, therefore, intended that all matter contained in the description or shown in the accompanying drawings be interpreted as illustrative and not in a limiting sense.

I claim:

1. In combination with a wall including adjacent fluid cooled tubes arranged in a row and connected by intermediate spacer fins and providing a boundary for a chamber confining heating gases, means defining an opening in said wall, an opaque member having an aperture therein, mounting means for supporting said apertured member such that said aperture is in optical registry with said wall opening, translucent image display means disposed in optical registry with said aperture and spaced therefrom to receive a focused image thereon, opaque walled closure means located between and connecting said apertured member and said display means for providing an enclosed light transmissive path therebetween.

2. The combination of claim 1 wherein said closure means has a first cross sectional area at a first end thereof and a second larger cross sectional area at the other end thereof, said aperture member being located at said first end and said image display means being located at said other end.

3. The combination of claim 2 including lens means located in and embraced by said aperture and wherein said translucent image display means is a normally transparent material of which a surface thereof is ground and said surface faces said lens means.

4. The combination of claim 3 including first duct means for admitting a high pressure gaseous fluid to the interior of said closure means; and second duct means located in said apertured member, said second duct means having a first end in communication with the interior of said closure means and a second end disposed to deliver said gaseous fluid to the area immediately adjacent that surface of said lens which is in contact with said heating gases.

5. The combination of claim 4 wherein said translucent image display means is a glass screen having a ground surface and said lens means is a double convex lens.

6. The combination of claim 5 including focusing means whereby said image display means may be moved toward or away from said lens while maintaining optical registry, thereby obtaining proper focusing of an image.

7. The combination as defined in claim 1 wherein pivotal mounting means for the unit comprising said apertured member, said closure means, and said image display means allow angular motion of said unit with respect to said wall, said pivotal mounting means being located to place the aperture of said apertured member substantially at the apex of said angular motion.

8. The combination of claim 1 wherein said apertured member is substantially spherical and said mounting means comprises a socket member engaging said spherical apertured member to permit pivotal motion thereof.

9. The combination of claim 8 including locking means connected to said socket member, said locking means having a first position which permits pivotal motion of said spherical apertured member and a second position which prevents said pivotal motion.

References Cited

UNITED STATES PATENTS

| | | | |
|---|---|---|---|
| 2,545,886 | 3/1951 | Kooistra | 110—179 |
| 3,233,597 | 2/1966 | Svendsen | 122—235 |

FOREIGN PATENTS 696,434   9/1953   Great Britain.

KENNETH W. SPRAGUE, Primary Examiner

U.S. Cl. X.R.

126—200